INVENTOR
William F. Cruess
BY
Ralph H. Swingle
ATTORNEY

INVENTOR
William F. Cruess

United States Patent Office 2,749,535
Patented June 5, 1956

2,749,535

TELEMETERING SYSTEMS

William F. Cruess, Pittsburgh, Pa., assignor to Westinghouse Electric Corporation, East Pittsburgh, Pa., a corporation of Pennsylvania Application November 23, 1951, Serial No. 257,813

17 Claims. (Cl. 340—183)

My invention relates generally to telemetering systems, and has reference in particular to impulse telemetering systems for registering the value of a quantity which is to be measured at a remote location.

Generally stated, it is an object of my invention to provide in a new and novel manner for transmitting the actual reading of a metering device from one location to a remote location.

More specifically, it is an object of my invention to provide for continuously registering the value of a quantity at one location, and transmitting to another location at stated intervals impulse signals for operating counting means to obtain a reading of the value recorded.

Another object of my invention is to provide for continuously registering the integrated value of a quantity on a plurality of counting means arranged in decade, periodically connecting an impulse device for operating a common counting means in conjunction with each of said plurality for transmitting coded signals representing the individual readings of the plurality of counting means, and for sequentially operating a plurality of counters at a remote location in accordance with the coded signals.

Yet another object of my invention is to provide in a remote impulse metering system for using a check code of a greater number of impulses than the count of any one of a plurality of impulse counting storage devices for initiating operation of an impulse receiver, so that the erroneous readings will not be recorded in the event the receiver is connected for operation at other than the beginning of the transmitting period.

It is also an object of my invention to provide in a telemetering system for transmitting the actual integrated value of a quantity to be measured each time a reading is made.

A further object of my invention is to provide for transmitting at predetermined intervals a series of sequences of impulses which represent the actual readings of each the dials of a watthour meter, and for selectively connecting a plurality of counters at a remote station corresponding to the dials of the watthour meter so as to operate the counters in accordance with the impulses.

Other objects will in part be obvious, and will in part be described hereinafter.

For a more complete understanding of the nature and the scope of my invention, reference may be had to the following detailed description, which may be read in connection with the accompanying drawings in which:

Figures 1 and 2 taken together are a diagrammatic view of the impulse storage circuit of a telemetering transmitter embodying the invention in one of its forms.

Figure 1:
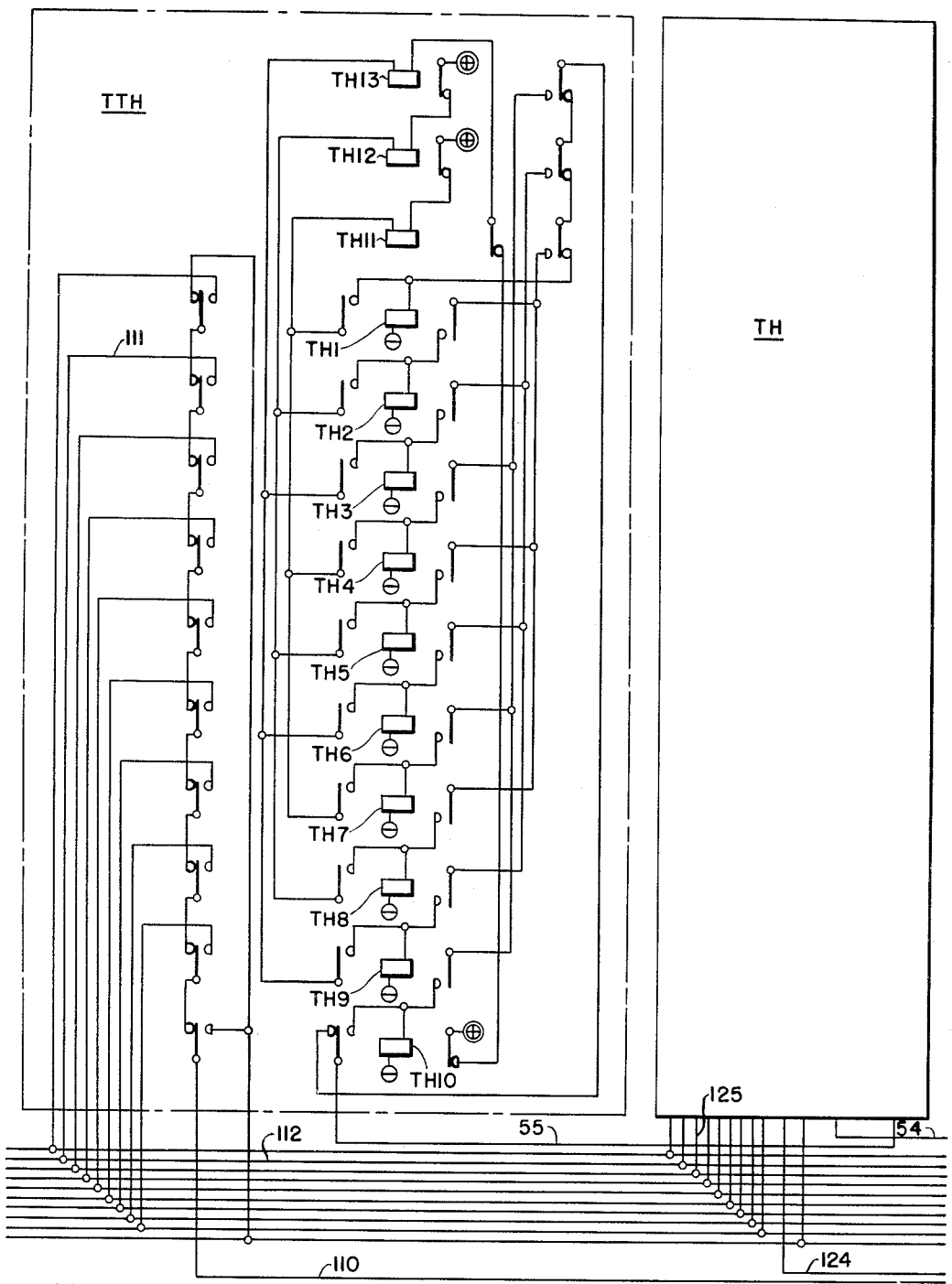
Figure 2:
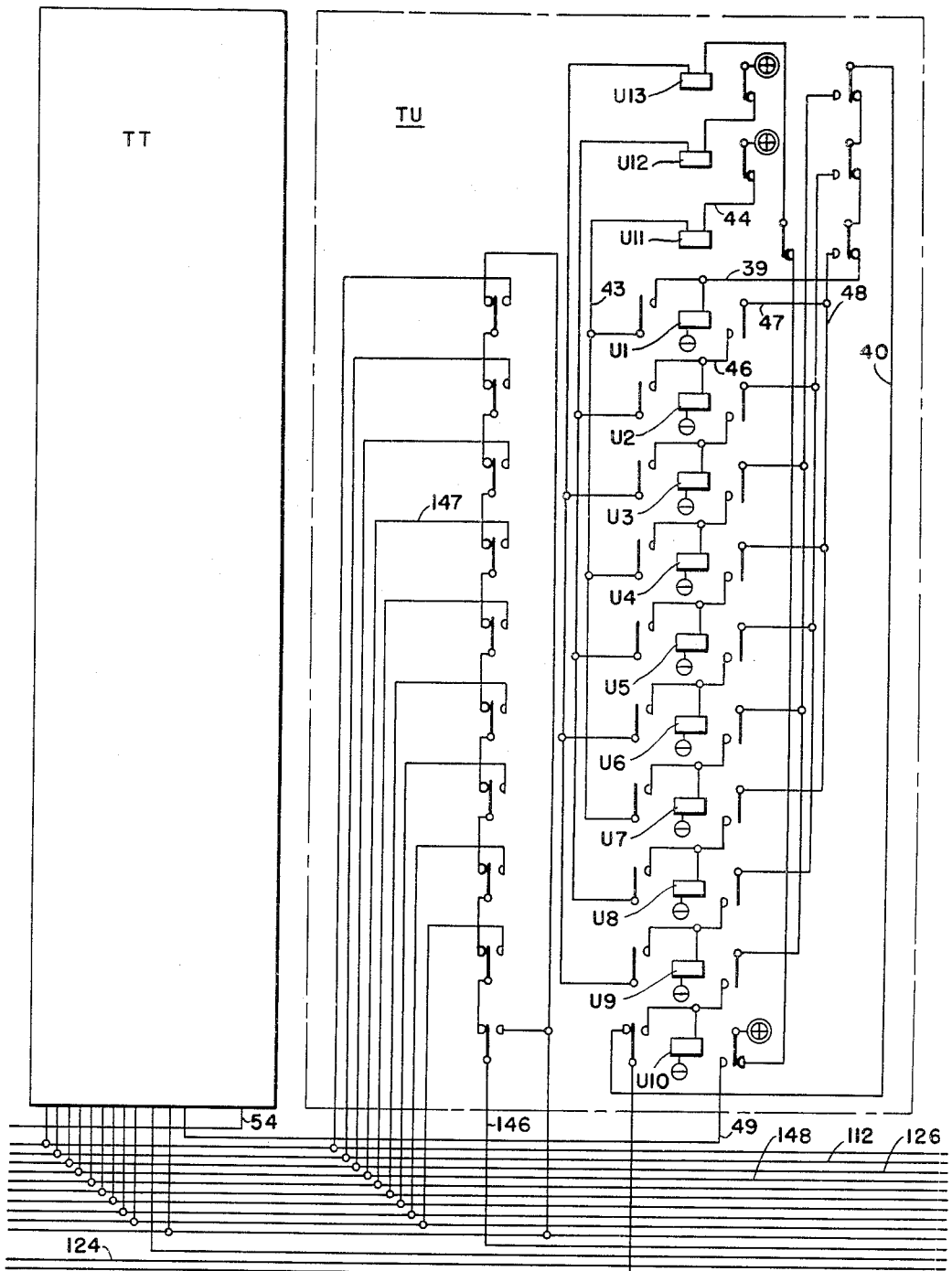
Figure 3:
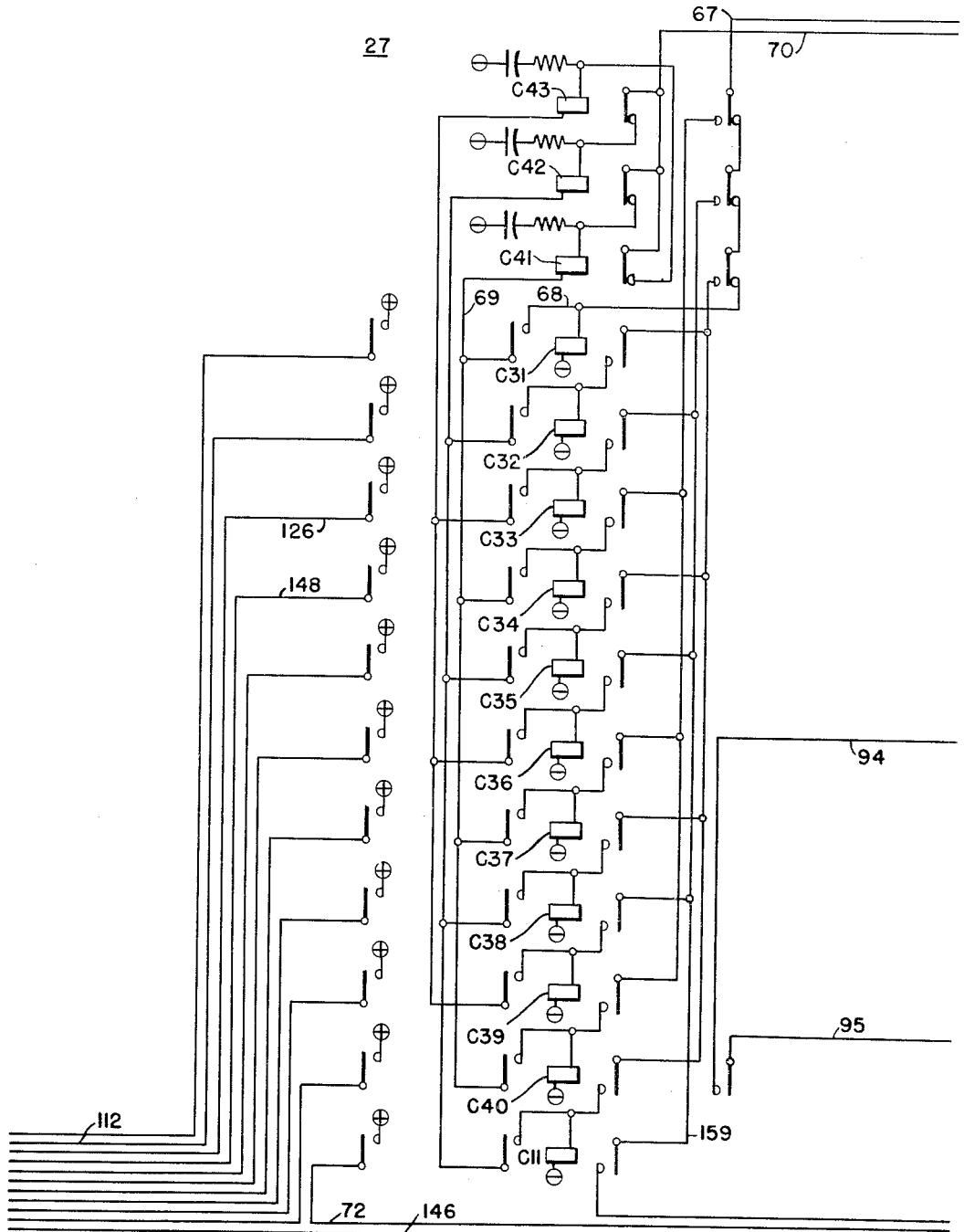
Fig. 3 is a diagrammatic view of a common counting circuit disposed to be used in connection with the storage circuit of Figs. 1 and 2.

Figs. 1 through 7 are disposed to be placed side by side, reading in order from left to right, and when so located they represent the complete circuit diagram of a telemetering system embodying the present invention. Referring generally to the drawings, it will be seen that the transmitter comprises an impulse storage circuit having a plurality of suitable counting means, such as stepping relays or counting circuits TU, TT, TH and TTH, which are arranged in decade for recording the units, tens, hundreds and thousands digits representing the number of impulses produced by a contact making watthour meter device 25 which has a corresponding plurality of dials for recording the reading thereof. The meter device 25 may be arranged by means of suitable gears or the like to actuate a contact arm $a$ so as to produce one impulse per unit registration of its register whether it be kilowatt or megawatt hours. A common counting circuit 27 shown in Fig. 3 is disposed to be connected by means of control means 30, to provide for stopping an impulse producing keying relay 5, used for transmitting impulses, either directly by wire, by microwave or by keying a carrier frequency transmitter 32, which is shown as coupled to one of the conductors 34 of a distribution circuit or the like, but may as readily transmit through space, for transmitting a plurality of coded impulses which represent the counts of the different counting circuits.

The telemetering receiver comprises a corresponding receiver, such as, for example, a carrier frequency receiver 35, which may likewise receive through space, or be also connected to the conductor 34 for operating an impulse receiving relay R1, which operates a plurality of counters RU, RT, RH, and RTH under the control of transfer means 36, which selectively controls the connections of the different counters to the impulse receiving relay.

Referring particularly to Figs. 1 and 2, it will be seen that the counting circuit TU, which may be taken as typical of any one of the circuits TU, TT, TH and TTH comprises, for example, a plurality of counting relays U1 through U10, which operate sequentially in conjunction with sequence relays U11, U12 and U13 in a manner well known in the art, in response to impulses provided by the closing of the contact arm $a$ of the watthour meter device 25, to record the units digit of the watthour meter device reading. The counting circuit TT which is similar to the counting circuit TU, is shown in outline for purposes of simplification, and comprises a similar plurality of counting relays which would be designated by the prefix T. Circuit 21 is connected so that each time the last relay U10 of the units counting circuit operates, one impulse is applied to the counting circuit TT, so that a complete count will be made by the relays of circuit TT after ten complete counts have been made by each of the relays of circuit TU, and the circuit TT will, accordingly, register the tens digit of the watthour meter device reading. The counting circuit TH likewise comprises a plurality of counting relays similar to those of circuit TU, except designated by the prefix H. It records the hundreds digit of the reading of the watthour device 25, and the relays thereof are connected with those of circuit TT so as to operate in sequence, one each time the relays of the tens counting circuit TT make a complete operation. Likewise, the counting circuit TTH, which records the thousands digit of the reading of the watthour device 25, are connected with those of circuit TH so as to operate in sequence, one each time the relays of counting circuit TH make a complete counting operation. Counting circuit TTH may comprise, as shown, a plurality of counting relays TH1 through TH10 which operate in conjunction with their sequence relays TH11, TH12 and TH13, in a manner identical with that of the units counting circuit TU.

Referring to Fig. 3, it will be seen that the common counting circuit 27 may comprise a plurality of counting relays C31 through C40 and C11, which operate in conjunction with sequence relays C41, C42 and C43, respectively, for controlling the control means 30 which starts and stops operation of the keying relay 5, so as to transmit a plurality of sequences of impulses corresponding to the counts of the different counting circuits TU, TT, TH and TTH.

Figure 5:
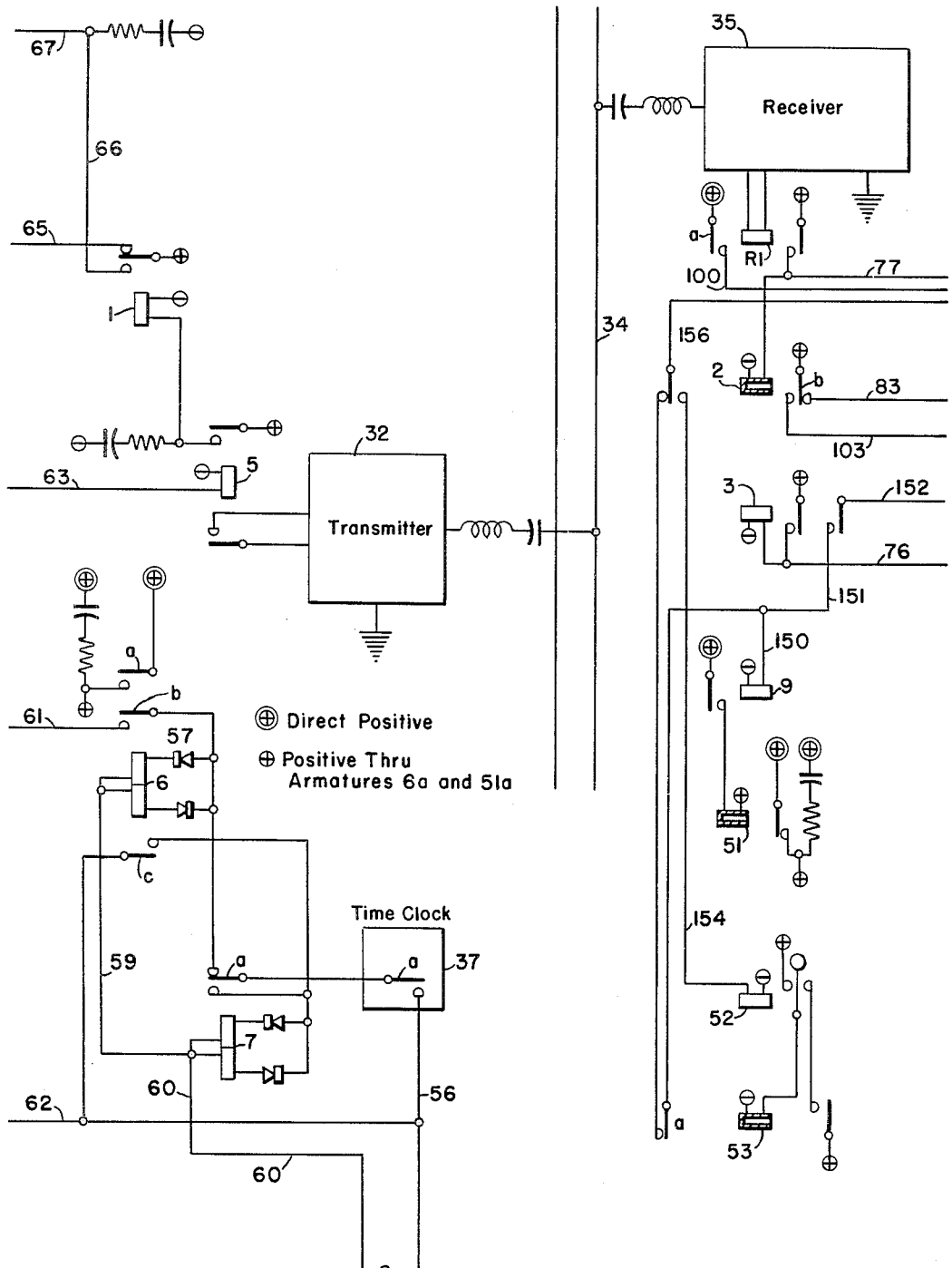
Fig. 5 is a diagrammatic view of portions of the telemetering transmitter and the receiver used therewith showing one method of connection therebetween.

Referring particularly to Fig. 5, it will be seen that the keying relay 5 operates in conjunction with a drive relay 1, which is energized upon operation of the keying relay 5, and operates to interrupt the energizing circuit of the keying relay, so as to provide for producing impulses. Means such as a clock operated time switch 37 may be provided for initiating operation of the keying relay 5 in conjunction with a pair of cycling relays 6 and 7, which are controlled by the time switch and the control means 30 so as to provide an operating circuit for the impulse relay for performing only one cycle of impulse readings, regardless of whether the time switch contacts may remain closed after one complete cycle of impulses has been sent. The watthour meter device 25 may operate to produce impulses at a rate on the order of one or two a second, while the keying relay and drive relay operate to produce impulses at a rate on the order of fifteen or more a second.

Figure 4:
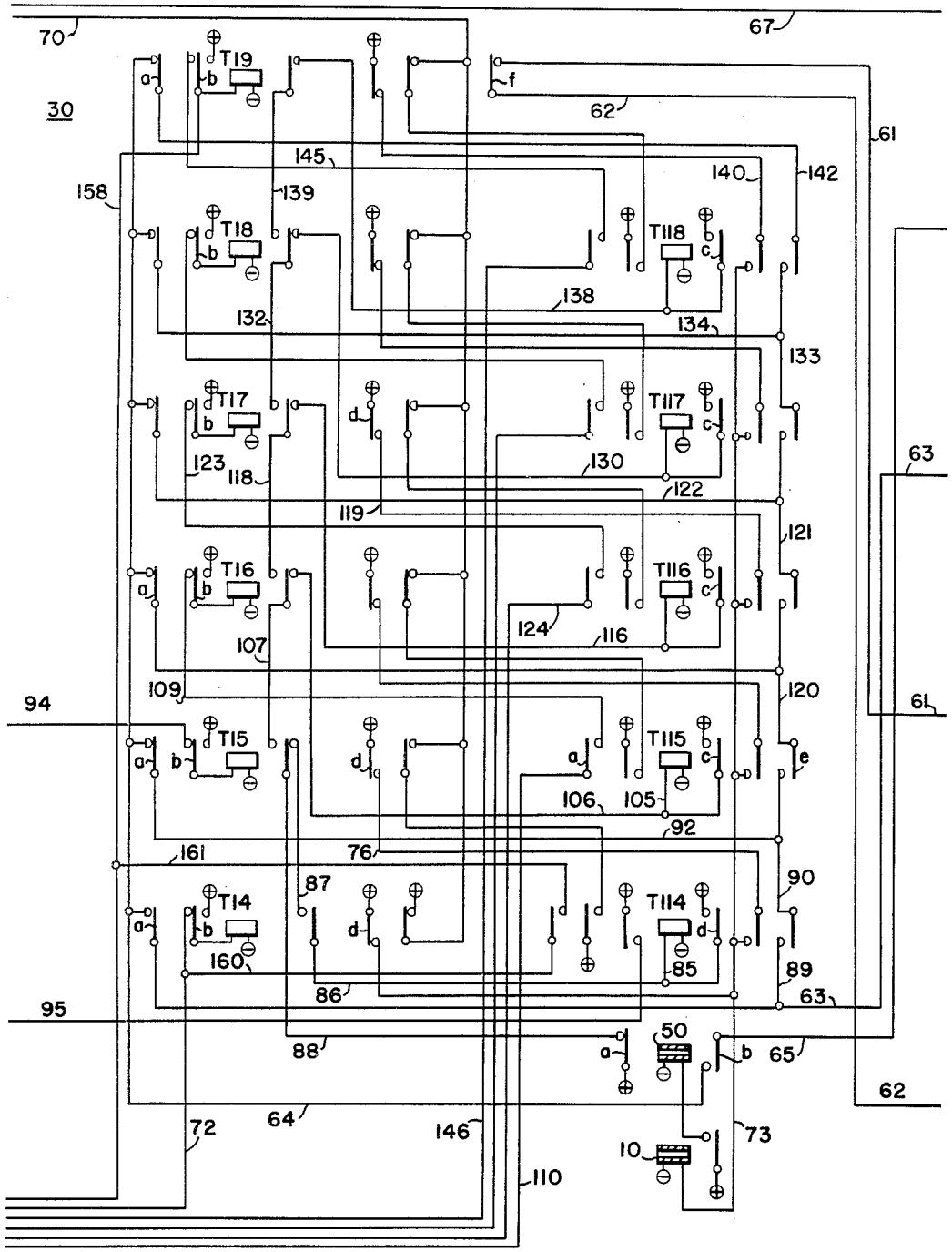
Fig. 4 is a diagrammatic view of the control relays used to control the connection of the counting circuit to the storage circuit.

Referring to Fig. 4, it will be seen that a pair of time delay relays 10 and 50 are provided for operating to provide a time delay between each sequence of impulses, so as to provide for selectively receiving the different sequences of impulses. The control means 30 may comprise a stop relay T14 whose function is to terminate a preliminary code which is initiated by the time clock effecting operation of the common counting circuit 27 to transmit a preliminary code of eleven impulses preparatory to transmitting the reading of the watthour meter device 25 so as to properly condition the telemetering receiver. A start relay T114 may be provided for then initiating operation of the keying relay 5 to start a restoration code of ten impulses for resetting any of the counters RU, RT, RH and RTH which still show the previous reading. A stop relay T15 is provided for interrupting the operating circuit of the keying relay 5 to stop the restoration code. In order to provide for then transmitting impulses corresponding to the reading of the thousands counting circuit TTH, a start relay T115 may be provided for effecting operation of the keying relay 5, and a relay T16 is provided for disconnecting the operating circuit of the keying relay when the count of the common counting circuit 27 equals that of the thousands counting circuit. A start relay T116 is provided for then effecting operation of the keying relay 5 so as to provide for transmitting a plurality of impulses corresponding to the reading of the hundreds circuit, and a stop relay T17 is provided for interrupting the operating circuit of the keying relay 5 when the count of the common counting circuit equals that of the hundreds circuit. A start relay T117 is provided for then completing an operating circuit for the keying relay 5 to provide for transmitting a plurality of impulses corresponding to the reading of the tens counting circuit, and a stop relay T18 is provided for disconnecting the operating circuit of the keying relay 5 when the count of the common counting circuit 27 equals that of the tens circuit. A start relay T118 thereupon provides an operating circuit for relay 5 so as to provide for transmitting a plurality of impulses corresponding to the reading of the units counting circuit, and a stop relay T19 is provided for interrupting the operating circuit of the keying relay 5 to terminate the impulses when the common counting circuit 27 equals the count of the units counting circuit.

Figure 7:
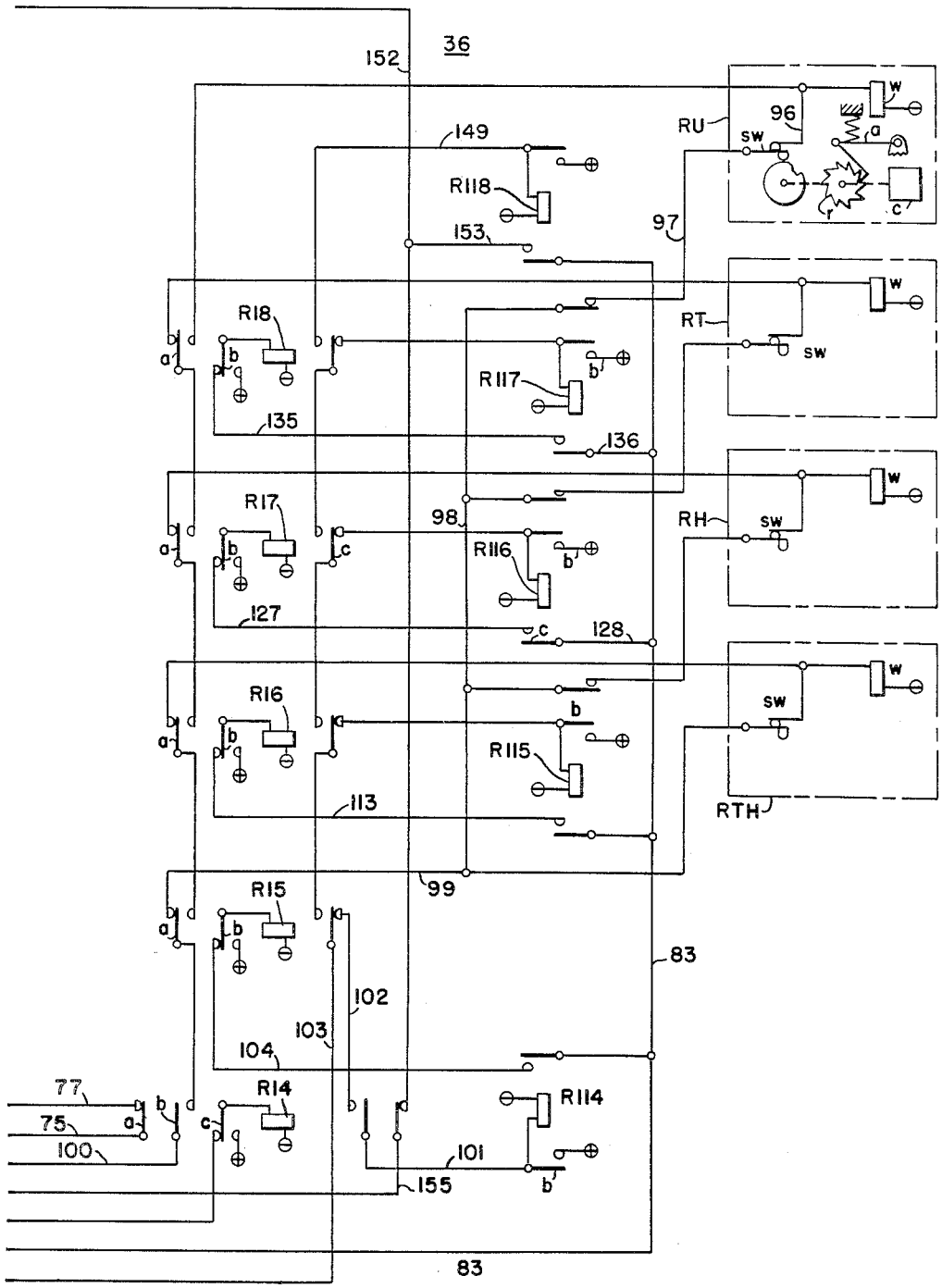
Fig. 7 is a diagrammatic view of a portion of the telemetering receiver showing the plurality of counters and the transfer means associated therewith.

Referring to Fig. 7, it will be seen that the counter RU, RT, RH and RTH may be similar. Each comprises an operating winding $w$ for actuating an armature $a$ to actuate a ratchet $r$ which operates a counter $c$. A cam switch $sw$ provides an operating circuit through the winding $w$ to actuate the counter $c$ until it reaches its zero position, in which the switch $sw$ opens, so that the counters may be reset to a zero reading.

Figure 6:
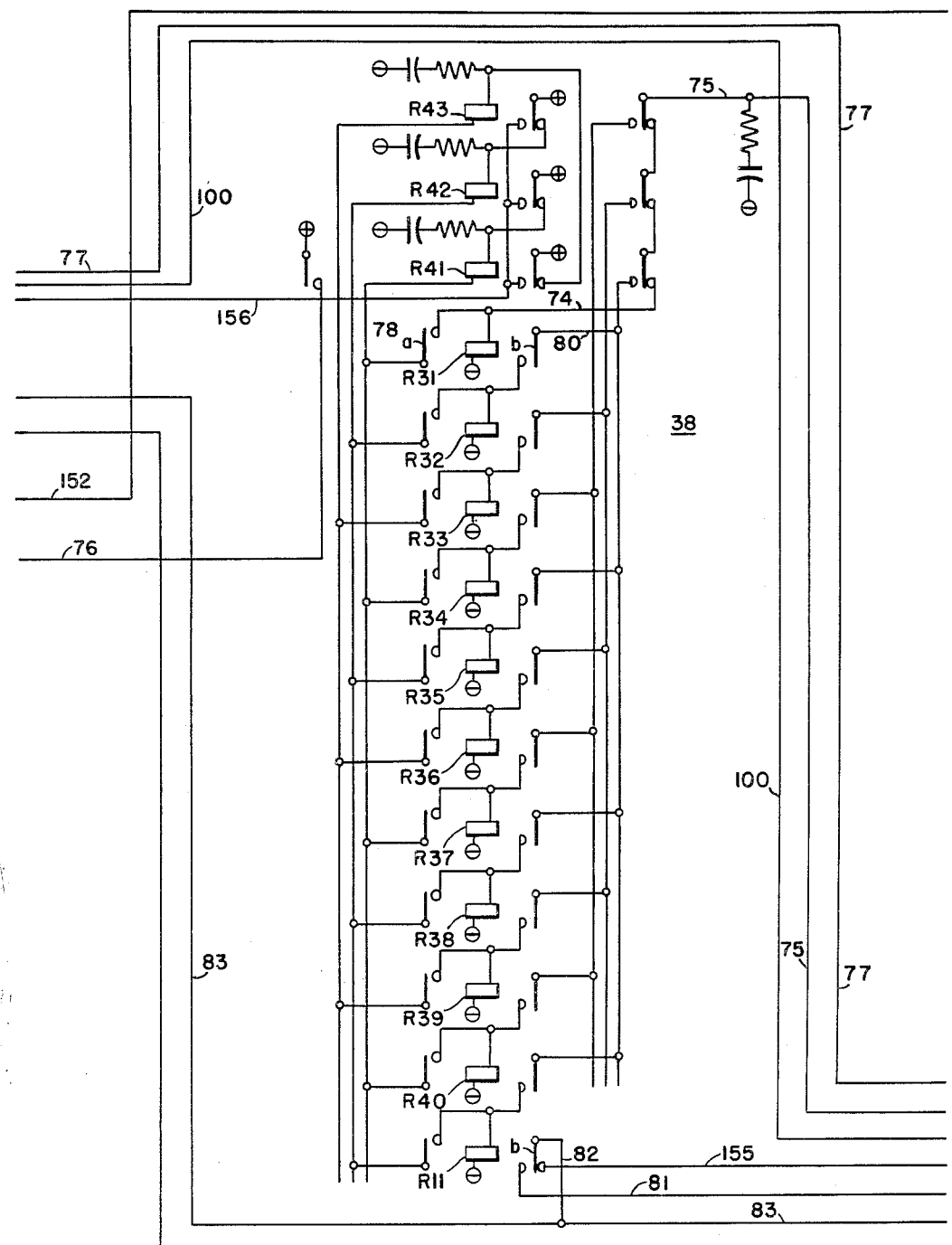
Fig. 6 is a diagrammatic view of a counting circuit used in the telemetering receiver.

Referring to Figs. 5, 6 and 7, it will be seen that the impulse receiving relay R1 is connected to operate in accordance with the receipt of impulses by the carrier frequency receiver 35 from the carrier frequency transmitter 32. A counting circuit 38 is provided, comprising a plurality of counting relays R31 through R40 and R11 which operate in conjunction with sequence relays R41, R42 and R43, respectively, to operate in response to the preliminary code transmitted for initiating a receiving operation. A check relay R14 is provided as a part of the control circuit for the counters RU, RT, RH and RTH which only operates in the event that eleven impulses are received, and then sets up an operating circuit for a transfer control relay R114 which operates at the beginning of the reset code to set up an energizing circuit for a transfer relay R15. Relay R15 operates at the end of the reset code and disconnects the reset circuits of the counters from the impulse receiving relay, and connects the thousands counter RTH for operation in accordance with the count of the thousands counting circuit TTH. A transfer control relay R115 operates at the beginning of the thousands code to set up an energizing circuit for a transfer relay R16 which operates at the end of the thousands code and connects the hundreds counter RH for operation in accordance with the hundreds code as received by the impulse receiving relay. A transfer control relay R116 is provided for setting up at the beginning of the hundreds code an operating circuit for transfer relay R17, which operates at the end of the hundreds code to disconnect the hundreds counter from the impulse receiving relay R1 and connect the tens counter RT thereto. A transfer control relay R117 is provided for setting up an operating circuit at the beginning of the tens code for transfer relay R18, which operates at the end of the tens code and disconnects the tens counter RT from the impulse receiving relay, and connects the units counter RU thereto. A reset control relay R118 is provided for setting up an operating circuit for a reset control relay 9 shown in Fig. 5 at the end of the units sequence of impulses. Relay 9 controls a time delay reset relay 51, which disconnects the receiver battery or direct positive from the indirect positive connections of the receiver to restore the receiver to a reset condition. A receiving drive relay 2 of the delayed dropout type operates so as to remain in the energized position during any sequence of impulses, and return to the deenergized position a predetermined time after cessation of such pulses for effecting operation of the transfer relays. Timing relays 52 and 53 may be provided in conjunction with a timing control relay 3 for effecting operation of the reset relay 51 in the event that less than a complete sequence of impulses is received, due to a disturbance on the line or some other such fault condition.

In normal operation, the watthour meter device 25 operates continuously to produce current impulses corresponding to the rate of flow of electrical energy which is to be measured. When contact arm $a$ of the meter engages its front contact a circuit is provided for operating counting relay U1, which circuit extends from negative through the winding of relay U1 through conductor 39, back contacts and armatures of sequence relays U11, U12, and U13, conductor 40 through back contact and armature of relay U10, conductor 41, contact arm $a$ and front contact of watthour meter device 25 to direct or battery positive. Relay U1 accordingly is energized and sets up an energizing circuit for sequence relay U11 through a circuit extending from battery negative, through the winding of relay U1, conductor 39, front contact and armature of relay U1, conductor 43, winding of relay U11 and conductor 44, through back contact and armature of relay U12 to direct positive. Relay U11 does not pick up while the arm $a$ and front contact of the watthour meter device 25 remain closed, since this armature provides a shunt circuit around the winding of relay U11. However, as soon as the arm $a$ separates from its front contact, sequence relay U11 is energized in series with counting relay U1. The next time arm $a$ engages its front contact, an energizing circuit is provided for relay U2, extending from negative through the winding of relay U2, conductor 46, front contact and armature of relay U1, conductor 47, conductor 48, front contact and armature of relay U11, back contact and armature of relay U12, back contact and armature of relay U13 through conductors 40 and 41 as traced for the energizing circuit of relay U1. In this manner, relays U1 through U10 are energized in sequence in conjunction with the sequence relays U11 through U13, in response to consecutive current impulses from the watthour meter device 25.

When relay U10 operates at the end of a complete counting sequence for the counting circuit TU, direct positive is connected to conductor 49 for energizing the first relay of the tens counting circuit TT in the same manner that relay U1 of the units counting circuit was energized. Accordingly, each time the units counting circuit TU makes a complete count, one more relay of the tens counting circuit TT will be energized.

When the tens counting circuit TT is operated through a complete sequence, direct positive will likewise be connected to conductor 54 for energizing the first counting relay of the hundreds circuit TH. After ten complete counting sequences of the tens counting circuit TT, the hundreds counting circuit TH will have completed one full sequence and conductor 55 will be connected to direct positive for energizing the first counting relay TH1 of the thousands counting circuit TTH. Each time the hundreds counting circuit TH goes through a complete count, the thousands circuit TTH operates to register another count. Thus, the counting circuits TU, TT, TH and TTH are continuously operated to record the integrated reading of the watthour meter device 25 at any given time.

When the time switch 37 operates, an energizing circuit is provided for operating cycling relay 6, extending from conductor 56 through armature $a$ of switch 37, armature and back contact of cycling relay 7, rectifier device 57, the upper half of the operating winding of sequence relay 6, conductor 59 and conductor 60, for operating relay 6. Direct positive is thereupon connected to the different indirect positive terminals of the transmitter through armature $a$ of relay 6. A holding circuit is provided for relay 6, extending through armature $b$ of relay 6 and front contact, conductor 61, armature $f$ and back contact of relay T19, and conductor 62 to conductor 56. An energizing circuit is provided for the cycling relay 7 through armature $c$ of relay 6, which interrupts the operating circuit for the relay 6 at armature $a$ of relay 7 so as to prevent recycling in the event that the contacts of the time clock remain closed after the complete sequence of impulses had been transmitted. As soon as direct positive is supplied through armature $a$ of relay 6, relay 10 is energized through an obvious circuit including armature $d$ of relay T14. An obvious energizing circuit is thereupon provided for time delay relay 50. This completes an energizing circuit for the keying relay 5, extending from negative through the operating winding of relay 5, conductor 63, armature $a$ and back contact of relay T14, conductor 64, front contact and armature $b$ of relay 50, and conductor 65 through back contact and armature of relay 1 to indirect positive. Relay 5 operates, keying the carrier transmitter 32, and at the same time providing an obvious energizing circuit for relay 1, which operates to interrupt the energizing circuit for keying relay 5 to terminate the first impulse.

Operation of relay 1 connects indirect positive to the common counting circuit 27 for operating relay C31. This circuit extends from indirect positive through armature and front contact of relay 1, conductor 66, conductor 67, armatures and back contacts of relays C43, C42 and C41, to operating winding of relay C31. Relay C31 is energized and provides an energizing circuit for sequence relay C41, extending from negative through operating winding C31, conductor 68, front contact and armature of relay C31, conductor 69, operating winding of relay C41, back contact and armature of relay C42, conductor 70, and back contact and armature of relay T14 to indirect positive. The keying relay 5 and its drive relay 1 continue to operate in this manner, energizing relays C31 through C40 and relay C11 in conjunction with the sequence relays C41, C42 and C43 to transmit a count of 11 impulses, which comprise a preliminary code.

At the end of the eleventh pulse an energizing circuit is provided for the preliminary code stop relay T14, extending from negative through the operating winding of relay T14, armature $b$ and back contact of relay T14, conductor 72, and armature and front contact of relay C11 to indirect positive. Relay T14 is energized and provides a holding circuit for itself through its armature $b$ and make before break front contact which operates to complete the holding circuit before breaking the original circuit through the back contact. Operation of relay T14 interrupts the energizing circuit for the keying relay 5 at armature $a$ of relay T14, thus stopping the sending of impulses. The energizing circuit for the time delay relay 10 is interrupted at armature $d$ of relay T14, so that relay 10 returns to the deenergized position after a predetermined time, deenergizing relay 50, which remains in the energized position for a predetermined time before also returning to the deenergized position.

Upon receipt of the first impulse by the carrier frequency receiver 35, the receiving relay R1 is energized and provides an obvious energizing circuit for the receiving drive relay 2, which is of the time delay dropout type and remains in the energized position during a sequence of impulses. The counting circuit 38 operates in response to operation of the receiving relay 1, relay R31 being energized upon the first operation over a circuit extending from negative through the winding of relay R31, conductor 74, back contacts and armatures of relays R41, R42 and R43, conductor 75, back contact and armature $a$ of check relay 14, conductor 77 to front contact and armature of relay R1. Relay R31 operates, and provides an energizing circuit through its armature for sequence relay R41. Since the armature and front contact of relay 1 are in shunt with the winding of sequence relay R41 the sequence relay does not operate until the end of the first impulse, whereupon it is energized in series circuit relation with relay R31 over a circuit extending from negative, through the operating winding of relay R31, front contact and armature $a$ of relay 31, conductor 78, operating winding of relay R41 and back contact and armature of relay R42 to indirect positive. Timing control relay 3 is energized at the end of the first impulse over conductor 76 and front contact and armature of sequence relay R41. Upon the receipt of the second impulse, receiving relay R1 again operates, and an energizing circuit is provided for the second relay of the counting circuit, relay R32 extending from negative through the operating winding of relay R32, front contact and armature $b$ of relay R31, conductor 80, front contact and armature of relay R41, back contact and armature of relay R42, back contact and armature of relay R43, conductor 75, back contact and armature *a* of relay R14, and conductor 77 to indirect positive through front contact and armature of relay R1.

The counting circuit 38 continues to operate in this manner with relays R33 through R40 and R11 operating in sequence, in conjunction with the sequence relays R41, R42 and R43, until eleven impulses have been received. When relay R11 operates, upon receipt of the eleventh impulse, an energizing circuit is set up for the check relay R14 at armature *b* of relay R11. When the receiving drive relay 2 returns to the deenergized position a predetermined time after termination of impulses from the transmitter, the energizing circuit for the relay R14 is completed, extending from negative through the operating winding of relay R14, armature *c* and back contact of relay R14, conductor 81, front contact and armature of relay R11, conductor 82, conductor 83 and back contact and armature *b* of relay 2 to indirect positive. Relay R14 operates and provides a holding circuit for itself through its make before break front contact and armature *c*. An operating circuit for restoring the counters RU, RT, RH and RTH to their zero positions by energizing their operating windings *w* through their respective cam switches *sw* is thereupon provided through armature *b* of relay R14.

Upon return of time delay relay 50 to the deenergized position, an energizing circuit is provided for the start relay T114, which initiates transmission of the restoration code of ten impulses for returning the counters of the telemetering receiver to the initial or zero position. This circuit may be traced from negative through the operating winding of relay T114, conductor 85, conductor 86, armature and front contact of relay T14, conductor 87, back contact and armature of relay T15, conductor 88, back contact and armature *a* of relay 50 to indirect positive. Relay T114 is energized, and provides a holding circuit for itself at armature *d*, and an energizing circuit for the time delay relay 10 through conductor 73, front contact and armature of relay T114, conductor 76 and armature *d* of relay T15 to indirect positive. Relay 10 provides an obvious circuit for relay 50, and relay T114 also completes in conjunction therewith an energizing circuit for the keying relay 5, extending from negative through the operating winding of relay 5, conductor 63, conductor 89, front contact and armature of relay T114, conductor 90, conductor 92, armature *a* and back contact of relay T15, conductor 64, front contact and armature *b* of relay 50, conductor 65, and back contact and armature of relay 1 to indirect positive. The keying relay 5 and its drive relay 1 operate to transmit a series of ten impulses for resetting the counters to their zero positions. The common counting circuit 27 operates in accordance with the operation of the keying relay 5 as described hereinbefore, and upon the transmission of the tenth impulse counting relay C40 operates and provides an energizing circuit for the stop relay T15, extending from negative through the operating winding of relay T15, armature *b* and back contact of relay T15, conductor 94, front contact and armature of relay C40, conductor 95, and front contact and armature of relay T114 to indirect positive. Relay T15 provides a holding circuit for itself at armature *b* and make before break front contact, and also interrupts the energizing circuit for keying relay 5 at armature *a* of relay T15 to stop operation of the keying relay.

Upon receipt of the first impulse of the restoration code from the transmitter, the impulse receiving relay R1 is simultaneously connected to the counters through armature *a* of relay R15 and the cam switches of the counters, whereby they may be operated one step at a time with each impulse until they reach the zero position in which position their cam switches interrupt their reset circuits. The reset circuit for the units counter RU, for example, may be traced from negative through the operating winding *w* of the units counter, conductor 96, the cam switch *sw*, conductor 97, back contact and armature of relay R117, conductor 98, conductor 99, back contact and armature *a* of relay R15, front contact and armature *b* of relay R14 and conductor 100 to front contact and armature *a* of relay R1, and thence to direct positive.

When relay R1 is first energized, relay 2 is energized thereby, and an operating circuit is provided for control relay R114, extending from negative, through winding of relay R114, conductor 101, armature and front contact of relay R14, conductor 102, back contact and armature of relay R15, conductor 103, to front contact and armature *b* of relay 2. Relay R114 provides a holding circuit for itself at armature *b*. By the end of the restoration code all of the counters will be restored to their zero positions. The impulse receiving relay R1 returns to the deenergized position after receipt of the last impulse and interrupts the energizing circuit for the receiving drive relay 2. After a predetermined time delay relay 2 returns to the deenergized position and completes an energizing circuit for transfer relay R15, extending from negative through the operating winding of relay R15, armature *b* and back contact of relay R15, conductor 104, front contact and armature of relay R114 and conductor 83 to back contact and armature *b* of relay 2. Relay R15 interrupts the restoration circuit for the counters at armature *a* and provides an operating circuit for the thousands counter RTH at the same armature. A holding circuit is established for relay R15 through armature *b* and its make before break front contact.

At the transmitter, when time delay relays 10 and 50 return to the deenergized position, an energizing circuit is provided for the start relay T115 through conductor 105, conductor 106, back contact and armature of relay T16, conductor 107, front contact and armature of relay T15, conductor 88, and back contact and armature *a* of relay 50. Relay T115 connects the stop relay T16 to the thousands counting circuit TTH through armature *a*, completes a holding circuit for itself at armature *c*, and completes an energizing circuit for the keying relay 5 through armature *e* for transmitting impulses corresponding to the reading thereof. Assuming, for example, that the metering reading on the counting circuits TTH, TH, TT and TU is 2354, relays TH2 and TH12 of counting circuit TTH will be energized, the third relay of the hundreds counting circuit and the fifth relay of the tens counting circuit will be energized, as will also relays U4 and U11 of the units counting circuit.

Accordingly, when the keying relay 5 operates to send the first impulse, relay C31 will be energized over the circuit described hereinbefore and upon the second operation of relay 5, relay C32 will be energized. An energizing circuit is thereupon provided for stop relay T16, extending from negative through the operating winding T16, armature *b* and back contact of relay T16, conductor 109, front contact and armature *a* of relay T115, conductor 110, armatures and back contacts of relay TH10, relay TH9, relay TH8, relay TH7, relay TH6, relay TH5, relay TH4, relay TH3, armature and front contact of relay TH2, conductor 111, conductor 112, armature and front contact of relay C32 to indirect positive. Relay T16 operates, provides a holding circuit for itself at armature *b*, and interrupts the operating circuit for the keying relay 5 at armature *a* and stops the transmission of the thousands code.

At the receiver, operation of relay R15 connected the thousands counter RTH to the impulse receiving relay R1 at armature *a* and front contact, and two operations of this relay in response to the two impulses transmitted by the transmitter 32, operates the thousands counter RTH to its second operating position so as to register a reading of 2. Control relay R115 is energized upon the first impulse through back contact and armature of relay R16, front contact and armature of relay R15 and conductor 103, in response to operation of relay 2, and provides a holding circuit for itself at armature b. Upon return of the impulse receiving relay R1 to its deenergized position, receiving drive relay 2 is deenergized, and after a predetermined time also returns to the deenergized position. An energizing circuit is thereupon provided for the transfer relay R16, extending from negative through the operating winding of relay R16, armature b and back contact of relay R16, conductor 113, front contact and armature of relay R115, conductor 83 and back contact and armature b of receiving drive relay 2 to indirect positive. A holding circuit is provided for relay R16 through armature b and its make before break front contact.

At the transmitter, an energizing circuit is provided for the start relay T116 to connect the hundreds counting circuit and stop relay T17, and to start the keying relay 5, said circuit extending from negative through the operating winding of the relay T116, conductor 116, back contact and armature of relay T17, conductor 118, front contact and armature of relay T16, conductor 107, front contact and armature of relay T15 and conductor 88 to indirect positive through back contact and armature a of relay 50. Upon operation of the relay T116 a holding circuit is established at armature c and an energizing circuit is provided for relay 10 extending from negative through the operating winding of relay 10, conductor 73, front contact and armature of relay T116, conductor 119, and back contact and armature d of relay T17 to indirect positive. Relay 50 is thereupon energized and an energizing circuit is provided for the keying relay 5, extending from negative through the operating winding of relay 5, conductor 63, conductor 89, front contact and armature of relay T114, conductor 90, front contact and armature e of relay T115, conductor 120, front contact and armature of T116, conductor 121, conductor 122, back contact and armature of relay T17, conductor 64, front contact and armature b of relay 50, conductor 65 and back contact and armature of relay 1 to indirect positive. The keying relay 5 operates in conjunction with its drive relay 1 to energize the carrier transmitter 32 and at the same time operate the common counting circuit 27. When the third relay C33 of the common counting circuit 27 operates, an energizing circuit is provided for the stop relay T17 to interrupt the energizing circuit for the keying relay 5 and terminate transmission of the hundreds code. The energizing circuit for the relay T17 extends from negative through the operating winding of relay T17, armature b and back contact of relay T17, conductor 123, front contact and armature of relay T116, conductor 124, armatures and back contacts of relays H10 through H4 (not shown) of counting circuit TH, armature and front contact of relay H3 (not shown), conductor 125, conductor 126, front contact and armature of relay C33 to indirect positive. Relay T17 interrupts the operating circuit of the impulse relay at armature d and establishes a holding circuit at armature b.

At the receiver, the impulse receiving relay R1 operates in response to the three impulses transmitted, to actuate the hundreds counter RH, which is connected to the receiving relay at armature a and front contacts of relays R16 and R15, three times, to show a reading of 3. Upon the first impulse, control relay R116 is energized at front contact and armature b of driving relay 2, sets up an energizing circuit for transfer relay R17, at armature c, and establishes a holding circuit at its own armature b. When the impulse receiving relay R1 returns to its deenergized position, the receiving drive relay 2 will also return to the deenergized position after the predetermined time delay, whereupon an energizing circuit is completed for the transfer relay R17, extending from negative through the operating winding of the relay R17, armature b and back contact of relay R17, conductor 127, front contact and armature c of relay R116, conductor 128 and conductor 83 through back contact and armature b of relay 2 to indirect positive.

The relay R17 operates, and disconnects the hundreds counter RH from the impulse receiving relay R1 at armature a of relay R17, and connects the tens counter RT in its place. Relay R17 completes a holding circuit for itself through armature b and make before break front contact. The operating circuit for relay R116 is interrupted at armature c of relay R17.

When the time delay relay 50 of the transmitter returns to the deenergized position at the termination of the hundreds code, an energizing circuit is provided for the start relay T117 which connects the keying relay 5 to the tens counting circuit TT for transmitting the tens code. The energizing circuit for the relay T117 may be traced from negative through the operating winding of relay T117, conductor 130, back contact and armature of stop relay T18, conductor 132, front contact and armature of stop relay T17, conductor 118, front contact and armature of stop relay T16, conductor 107, front contact and armature of stop relay T15, and conductor 88 through back contact and armature a of relay 50 to indirect positive. Relay T117 operates to the energized position, provides a holding circuit at armature c, and an operating circuit for the keying relay 5, extending from negative through the operating windings of relay 5, conductor 63, conductor 89, front contact and armature of relay T114, conductor 90, front contact and armature e of relay T115, conductor 120, front contact and armature of the relay T116, conductor 121, front contact and armature of relay T117, conductor 133, conductor 134, back contact and armature of relay T18, conductor 64, front contact and armature b of relay 50, conductor 65, and back contact and armature of relay 1 to positive. The keying relay 5 and the drive relay 1 thereupon operate as hereinbefore described to key the carrier frequency transmitter 32 to transmit a code of impulses, 5 in number, corresponding to the reading or count of the tens counting circuit TT. Relay 1 energizes the common counting circuit 27 at armature a, and when the counting circuit 27 reaches the count of the counting circuit TT, an energizing circuit is provided for the stop relay T18 through the two counting circuits in a manner similar to that described for the relay T16 and the thousands counting circuit TTH, so that the operating circuit for the keying relay 5 is interrupted at armature a of relay T18 to stop the transmission of the tens code. A holding circuit for relay T18 is provided at armature b.

Upon receipt of the tens code at the receiver, the receiving relay R1 will be operated five times, and the tens counter RT, which is connected to the receiving relay through armature a of the transfer relay R18, will be operated five times to register a tens reading of 5. Upon receipt of the first impulse, control relay R117 is energized through back contact and armature of the transfer relay R18 and armature b of the drive relay 2, and establishes a holding circuit at armature b. At the termination of operation of the receiving relay R1, the receiving drive relay 2 remains in the energized position a predetermined time and then returns to the deenergized position. Upon return of the receiving drive relay 2 to the deenergized position, an energizing circuit is provided for the transfer relay R18, extending from negative through the operating winding of relay R18, armature b and back contact of relay R18, conductor 135, front contact and armature of relay R117, conductor 136, conductor 83, and back contacts and armature of relay 2 to indirect positive. Relay R18 operates to disconnect the tens counter RT from the receiving relay R1 at armature a and transfer the connection of the receiving relay to the units counter RU. A holding circuit is provided for relay R18 at its armature b and make before break contact.

Upon the termination of operation of the keying relay 5 at the end of the tens code, time delay relays 10 and 50 return to the deenergized position after a predetermined time delay, and an energizing circuit is thereupon provided for the start relay T118 for operating the keying relay and connecting the stop relay T19 to the units counting circuit TU. This circuit extends from negative through the operating winding of relay T118, conductor 138, back contact and armature of stop relay T19, conductor 139, front contact and armature of stop relay T18, conductor 132, front contact and armature of stop relay T17, conductor 118, front contact and armature of stop relay T16, conductor 107, front contact and armature of stop relay T15, conductor 88 and back contact and armature a of relay 50 to indirect positive. Relay T118 operates to the energized position, providing a holding circuit for itself at armature c, and an energizing circuit for relay 10 extending from negative through the winding of relay 10, conductor 73, front contact and armature of relay T118, conductor 140 and back contact and armature of stop relay T19. An energizing circuit for the keying relay 5 is also provided by the start relay T118, extending from negative through the winding of relay 5, conductor 63, conductor 89, front contact and armature of relay T114, conductor 90, front contact and armature e of relay T115, conductor 120, front contact and armature of relay T116, conductor 121, front contact and armature of relay T117, conductor 133, front contact and armature of relay T118, conductor 142, armature a and back contact of relay T19, conductor 64, front contact and armature b of relay 50, conductor 65, and back contact and armature b of relay 1 to indirect positive.

The keying relay 5 and the drive relay 1 thereupon operate in conjunction to key the carrier transmitter 32 to transmit the units code of 4 impulses. The common counting circuit 27 counts in accordance with operation of the drive relay 1 in the manner hereinbefore described, and when the common counting circuit 27 reaches a count of 4, which occurs upon operation of relay C34, an energizing circuit is provided for the units stop relay T19, extending from negative through the operating winding of the relay T19, armature b and back contact of relay T19, conductor 145, front contact and armature of start relay T118, conductor 146, armatures and back contacts of relay U10, relay U9, relay U8, relay U7, armature relay U6, relay U5, armature and front contact of relay U4, conductor 147, conductor 148, and front contact and armature of relay C34 to indirect positive. Stop relay T19 operates to the energized position, provides a holding circuit for itself at armature b, and interrupts the energizing circuit for the keying relay 5 at armature a of relay T19 to stop the sending of the units code. The holding circuit for cycling relay 6 is interrupted at armature a of relay T19. Relay 6 returns to the deenergized position, disconnecting the control relays from direct positive at its armature a, so as to deenergize and reset the transmitter to a normally deenergized operating condition.

Upon receipt of the units code of four impulses at the receiver, impulse receiving relay R1 operates four times to step the units counter RU to register a reading of 4, so that the complete reading on all the counters is now 2354, which corresponds to the reading of the counting circuits TTH, TH, TT and TU of the transmitter in this order. Upon receipt of the first impulse, control relay R118 is energized over a circuit extending from negative through the winding of the relay R118, conductor 149, front contacts and armatures of relay R18, relay R17, relay R16, relay R15, conductor 103, and front contact and armature of relay 2 to indirect positive. A holding circuit is provided at armature a for relay R118. Accordingly, when the receiving drive relay 2 returns to the deenergized position, a predetermined time after termination of the units code, an energizing circuit is provided for the reset control relay 9, extending from negative through operating winding of relay 9, conductor 150, conductor 151, front contact and armature of timing control relay 3, conductor 152, conductor 153, front contact and armature of relay R118, conductor 83, and back contact and armature of relay 2 to indirect positive. Relay 9 operates to the energized position and provides an obvious energizing circuit for the reset relay 51. This removes the direct positive from the system since the battery is disconnected from indirect positive at the armature of relay 51. All of the control relays are returned to the deenergized position, and after a predetermined time delay reset relay 51 likewise returns to the deenergized position and restores the battery to the control circuits. The control relays are now returned to their normal condition.

In the event that there is a line interruption so that the eleven impulses of the preliminary code are not all received, check relay R14 will not be energized, so that operation of the counters will be prevented. If this happens, an energizing circuit is provided for the reset control relay 9, extending from negative through the operating winding of the relay 9, conductor 150, conductor 151, front contact and armature of relay 3, conductor 152, back contact and armature of relay R14, conductor 155, back contact and armature b of relay R11, conductor 82, conductor 83, and back contact and armature b of relay 2, which drops at the end of a sequence of closely related impulses. Relay 9 thereupon operates the reset relay 51 to reset the receiver.

When sequence relay R41 is energized at the end of the first impulse received, timing relay 52 is energized over conductor 154, front contact and armature of relay 2, conductor 156 and armature and front contact of relay R41 to indirect positive. An obvious circuit for time delay relay 53 is provided through armature and front contact of relay 52. Should an incomplete transmittal be made from the transmitter, by reason of a line failure or the like, relay 2 returns to the deenergized position after a delay, and the armature of relay 52 is released and continues to vibrate, so that relay 53 is periodically energized for a relatively long interval. It is finally deenergized, and returns to the deenergized position, completing an operating circuit for relay 9 at armature a. Reset relay 51 is thereupon operated to reset the receiver as described hereinbefore.

In the event that more than eleven impulses are transmitted in the preliminary code, an energizing circuit is provided for stop relay T19, extending from the winding of relay T19 over conductor 158, front contact and armature of relay C11, front contact and armature of relay C41, back contacts and armatures of relays C42 and C43, conductor 67 and front contact and armature of relay 1. This terminates impulsing and resets the transmitter. In the event that more than ten impulses are transmitted in any other than the preliminary code sequence, a circuit for stop relay T19 is provided through front contact and armature of relay C11, conductor 72, conductor 160, armature and front contact of relay T114, conductors 161 and 158 to the winding of relay R19. Again the impulsing is stopped and the system reset.

From the above description and the accompanying drawings, it will be apparent that I have provided a telemetering system for directly registering the instantaneous value of a quantity which is to be measured. Each time a reading is made, the actual integrated value of the quantity will be obtained regardless of whether or not a previous reading may have been rendered incomplete by failure of the communications system or a temporary loss of power at either the transmitter or receiver, or other such cause. The counting circuits of the transmitter operate continuously to record the actual integrated value of the quantity and have sufficient capacity that there will be no loss in count, regardless of whether a reading is transmitted at the usual interval or not. A system embodying the features of my invention utilizes relays of the type which are well known in the supervisory control art and which are simple and inexpensive to manufacture and are reliable and durable in operation.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense.

I claim as my invention:

1. In counting apparatus, means producing pulses at a rate dependent on a quantity to be metered, counting means, circuit means normally connecting the pulse means and the counting means to operate the counting means for counting the total number of pulses over a long period of time, sending means operable to produce signals, normally inoperative counting means, circuit means connecting the normally inoperative counting means to the normally operable counting means, stop means, and control means connected to start the sending means and set up circuit means including the counting means for effecting operation of the stop means to stop the sending means when the normally inoperative counting means reaches a count equal to that of the normally operable counting means.

2. In combination, impulse metering means operable to produce pulses in accordance with a quantity to be measured, counting apparatus comprising, a plurality of counting means, circuit means connecting the counting means and impulse metering means to operate said counting means sequentially in accordance with the digits of a quantity to be measured to always record the integrated value of said quantity, a normally inoperative counting means, signal means operable to produce coded signals and effect operation of the normally inoperative counting means, stop means for the signal means, means for connecting the normally inoperative counting means to each of the plurality of counting means, relay means for starting the signal means and setting up an operating circuit for the stop means through the normally inoperative counting means and one of the plurality of counting means for stopping the signal means when the count of the normally inoperative and said one counting means is the same.

3. Signal means comprising, counting means, circuit means connecting the counting means to be continuously operable in response to incoming signals to provide a record of the total number of said signals at all times, sending means operable to produce signals at a rate faster than said counting means operates, normally inoperative counting means, circuit means connecting the sending means to effect operation of the normally inoperative counting means, circuit means for connecting the normally inoperative counting means and the other counting means and effecting operation of the sending means, and relay means controlled jointly by the counting means for stopping the sending means when the normally inoperative counting means reaches the same count as the other counting means.

4. In telemetering apparatus, an impulse meter device operable to produce impulses in accordance with a quantity to be measured, a plurality of counting means, circuit means connecting the counting means continuously to the impulse meter device to operate the counting means to record the integrated value of the quantity to be measured by the meter, sending means operable at a higher rate than said counting means to transmit coded signals, relay means operable to stop operation of the sending means, an additional counting means, and means including said relay means for selectively connecting the additional counting means and different ones of said counting means of said plurality of counting means in sequence to provide operating circuits for the sending means until the additional counting means registers a count corresponding to that of the particular one of said plurality of counting means with which it is connected.

5. Counting apparatus comprising, an impulse meter device including a switch operable to produce impulse signals at a rate dependent on a quantity being measured, counting means comprising a plurality of counting elements, circuit means continuously connecting the counting means to said switch for sequential operation to count said impulse signals and record the integrated total thereof, sending means operable to produce impulse signals, a common counting means, relay means for selectively connecting the common counting means in a circuit with each one of said plurality of counting means, means for stopping the sending means each time the common counting means reaches a count equal to that of the counting means to which it is connected, and relay means operable in response to stopping of the sending means to connect it in circuit with another one of said plurality of counting means.

6. An impulse transmitter comprising, an impulse meter device, a counting circuit including a plurality of counting means, circuit means connecting the counting circuit to the impulse meter device for always counting the total number of impulses, a common counting means, sending means, control means for initiating operation of the sending means to produce signal impulses and effecting operation of the common counting means at a rate which is faster than the counting means of said plurality, relay means connected for stopping the sending means when the common counting means reaches a count equal to the count of one of the plurality of counting means, and means including a time delay device for connecting the common counting means in circuit with another of the plurality of counting means and for effecting operation of the sending means.

7. In an impulse transmitter, impulse metering means operable to produce impulses at a rate dependent on a quantity to be measured, a plurality of counting means operable in decade a circuit connecting the counting means to the metering means to always record the digits of the integrated value of a quantity to be measured, a common counting means, impulse producing means, relay means operable to connect the common counting means in circuit with one of the plurality of counting means and to provide an operating circuit for the impulse producing means, a control relay associated with said one of the plurality of counting means operable when the common counting means reaches a count equal to that of said one counting means to stop the impulse producing means, relay means associated with another of said plurality of counting means for connecting the common counting means therewith and to provide and operating circuit for the impulse producing means, and time delay means controlled by said control relay for initiating a timing operation of said time delay means for effecting operation of said relay means a predetermined time after the impulse producing means is stopped.

8. In a telemetering system, a transmitter comprising, an impulse producing device, a plurality of impulse counting devices operable in decade, a circuit continuously connecting the counting devices to the metering devices to record the digits of the integrated value of a quantity to be measured, a high speed common counting means, impulse sending means, relay means for sequentially connecting the common counting means and the plurality of impulse counting devices to effect operation of the impulse sending means in accordance with the count of each of the plurality of counting devices, and a receiver comprising an impulse responsive relay, a plurality of counters corresponding to the plurality of counting devices of the transmitter, counting means operable in response to operation of the impulse responsive relay, and control means operable in response to predetermined operation of the counting means for sequentially connecting the impulse responsive relay to the counters to record the different counts of the plurality of impulse counting devices.

9. A telemetering system comprising in combination, a transmitter having an impulse producing device, impulse storage means including a plurality of impulse counting means operable in decade to register the quantity of impulses, a common counting means, impulse sending means, a plurality of stop relays for the sending means, a plurality of control relays for sequentially connecting the sending means to effect operation thereof and also connecting the common counting means to one after another of the plurality of counting means and for providing an operating circuit for the stop relays to stop the sending means when the count of the common counting means equal that of the particular one of the counting means to which it is connected, and a receiver having an impulse responsive relay, a plurality of counters corresponding to the plurality of counting means of the transmitter, control means for selectively connecting the counters to the impulse responsive relay in sequence, and counting means operable in response to a predetermined initial code of impulses to initiate operation of the control means.

10. A telemetering system comprising, a transmitter having a plurality of counting devices operable in decade in response to a plurality of impulses, sending means for producing impulses at a rate higher than that of the impulses to which the counting devices are responsive, a common counting device, circuit means connecting the common counting device to provide an operating circuit for operating it from the sending means to produce a predetermined check code of impulses, control means operable to stop the sending means, additional relay means for connecting the common counting device and each of the plurality of counting devices in sequence to provide operating circuits for the control means for interrupting the operating circuit therethrough for the sending means when the count of the common counting device equals that of the particular one of the plurality of counting devices with which it is connected, and time delay means operable in response to operation of the control means of one of the plurality of counting devices for effecting operation of the sending means and the relay means of another of said plurality of counting devices a predetermined time after the control means of said one counting device operates; and a receiver having an impulse responsive relay operable in response to operation of the sending means, a plurality of counters corresponding to the plurality of counting devices, relay means for sequentially connecting the counters for operation in accordance with the impulse responsive relay, and counting means operable in response to the predetermined check code for initiating operation of the relay means.

11. A telemetering system comprising, an impulse meter device, a transmitter having single counting circuit comprising a plurality of counting devices connected to operate in decade, a circuit connecting the counting circuit to the meter device to record at all times the integrated value of a quantity registered by the meter device in response to a plurality of impulses produced by the meter device, sending means for producing impulses at a rate higher than those to which the counting devices are responsive, a common counting device, relay means operable to connect the common counting device in circuit with each one of the plurality of counting devices and to provide an operating circuit for the sending means, control means connected in circuit with the common counting device and each of the counting devices for interrupting the operating circuit of the sending means, and time delay means operable in response to operation of the control means of one of the plurality of counting devices for effecting operation of the relay means of another of said counting devices a predetermined time after the control means of said one counting device operates; and a receiver having an impulse responsive relay responsive to operation of the sending means, a plurality of counters corresponding to the plurality of counting devices, transfer means including time delay means for sequentially connecting the counters for operation in accordance with operation of the impulse responsive relay, and time delay means operable in response to operation of the time delay means of the transmitter to effect operation of the transfer means.

12. In a telemetering receiver, a plurality of counters, an impulse receiving relay operable in response to the receipt of impulse codes including counting codes comprising different numbers of impulses, a plurality of control relays for selectively connecting the impulse receiving relay to operate the counters including relay means responsive to a code of impulses greater in number than any counting code for resetting the counters, and a time delay relay operable in response to a sequence of closely successive operations of the receiving relay to selectively provide operating circuits for the control relays in sequence a predetermined time after successive sequences of closely successive operation of the receiving relay.

13. An impulse receiver comprising, a plurality of counters, an impulse receiving relay, counting means for resetting the counters in response to operation of the receiving relay to an initial reset code, a plurality of control relays connected to sequentially connect the receiving relay for operating different ones of the counters, time delay means operable during a sequence of closely successive operations of the receiving relay for providing operating circuits for the control relays one at a time a predetermined time after successive sequences of closely successive operations of the receiving relay, and reset means including time delay means operable in response to the aforesaid time delay means for releasing the control relays.

14. An impulse counter comprising, an impulse receiving relay, a plurality of counters operable to count impulses in tens, a counting device operable to count a predetermined sequence of closely successive operations of the receiving relay greater than ten, means responsive to said counting device for operating the counters to restore them to zero readings, time delay means operable in response to a sequence of closely successive operations of the receiving relay to effect operation of the restoring means a predetermined time after the counting means registers the predetermined sequence of closely successive operations, and a plurality of control relays sequentially operable under the control of the time delay means at the end of successive sequences of operations after said predetermined sequence to selectively connect the counters to the impulse receiver one after the other.

15. An impulse counter comprising, a plurality of counters, an impulse responsive relay, counting means operable in response to a predetermined code of closely successive operations of the impulse responsive relay, relay means operable in response to such operation of the counting means to connect the counters for restoring them to a zero position in response to a subsequent sequence of operations of the impulse responsive relay, time delay means operable during a sequence of closely successive operations of the impulse responsive relay and disposed to return to a non-operated position a predetermined time after the termination of such a sequence, a plurality of control relays operable one at a time in sequence in response to return of the time delay relay to its non-operated position for sequentially connecting the impulse relay to one counter after another, and reset means for effecting deenergization of the relay means and time delay means a predetermined time after operation of the impulse responsive relay which time is greater than the delay of the time delay means.

16. Telemetering apparatus comprising, counting means, circuit means connecting the counting means to be continuously operable in response to incoming signals to provide a record of the total number of said signals at all times, sending means operable to produce signals at a rate faster than said counting means operates, normally inoperative counting means, means including a time controlled switch connecting the normally inoperative counting means and the other counting means to effect operation of the sending means, and relay means controlled jointly by both of the counting means operable to stop the sending means when the normally inoperative counting means reaches the same count as said other counting means.

17. In a telemetering system, a transmitter comprising, an impulse producing metering device, a plurality of impulse counting devices operable in decade, a circuit connecting the counting devices to the metering device to continuously record the integrated value of a quantity to be measured, a high speed common counting means, impulse sending means, means including a time switch operable to effect operations of the impulse sending means, relay means sequentially connecting the common counting means and the plurality of counting devices to effect operation of the sending means to operate the common counting means in accordance with the count of each of the plurality of counting devices in succession, and a receiver comprising an impulse responsive relay, a plurality of counters corresponding to the plurality of counting devices of the transmitter, counting means operable in response to operation of the impulse responsive relay, and control means operable in response to predetermined operation of the counting means to sequentially connect the impulse responsive relay to the counters to record the different counts of the plurality of impulse counting devices.

References Cited in the file of this patent

UNITED STATES PATENTS

| | | |
|---|---|---|
| 1,105,492 | Clement | July 28, 1914 |
| 1,498,544 | Fowler | June 24, 1924 |
| 1,614,678 | Nelson | Jan. 18, 1927 |
| 1,832,118 | Hershey | Nov. 17, 1931 |
| 2,116,372 | Weld | May 3, 1938 |
| 2,324,778 | Julius et al. | July 30, 1943 |
| 2,372,593 | McWhirter et al. | Mar. 25, 1945 |
| 2,389,275 | Rayner et al. | Nov. 20, 1945 |